(12) United States Patent
Reynolds

(10) Patent No.: US 12,712,189 B2
(45) Date of Patent: Aug. 18, 2026

(54) CONNECTED FUEL CELL VEHICLE PREDICTIVE FREEZE WAKE SCHEDULING

(71) Applicant: FORD GLOBAL TECHNOLOGIES, LLC, Dearborn, MI (US)

(72) Inventor: James Joseph Reynolds, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 803 days.

(21) Appl. No.: 18/086,764

(22) Filed: Dec. 22, 2022

(65) Prior Publication Data

US 2024/0213504 A1 Jun. 27, 2024

(51) Int. Cl.

*H01M 8/04223* (2016.01)
*H01M 8/04303* (2016.01)
*H01M 8/0432* (2016.01)

(52) U.S. Cl.

CPC ... *H01M 8/04253* (2013.01); *H01M 8/04303* (2016.02); *H01M 8/04365* (2013.01); *H01M 2250/20* (2013.01)

(58) Field of Classification Search

CPC ......... H01M 8/04253; H01M 8/04303; H01M 8/04365; H01M 8/04228; H01M 8/04955

See application file for complete search history.

(56) References Cited

U.S. PATENT DOCUMENTS

| | | | | |
|---|---|---|---|---|
| 9,728,798 | B2 | 8/2017 | Wake et al. | |
| 10,290,880 | B2 | 5/2019 | Clingerman et al. | |
| 10,547,067 | B2 | 1/2020 | Procter et al. | |
| 2015/0099200 | A1 * | 4/2015 | Staley | B60L 58/32 429/413 |
| 2016/0380282 | A1 * | 12/2016 | Maruo | B60L 58/31 429/414 |
| 2018/0019485 | A1 * | 1/2018 | Riley | H01M 8/04231 |
| 2021/0210777 | A1 | 7/2021 | Ito et al. | |

* cited by examiner

*Primary Examiner* — Stewart A Fraser
(74) *Attorney, Agent, or Firm* — David B. Kelley; Brooks Kushman P.C.

(57) ABSTRACT

Methods and systems for operating fuel-cell systems are disclosed. The amount of time the fuel-cell system is to be shut down can be calculated using external weather-related information. The amount of time the fuel-cell system is to be shut down can also be calculated using default settings. The fuel-cell system may be used to power an electric vehicle.

12 Claims, 4 Drawing Sheets

CONNECTED FUEL CELL VEHICLE PREDICTIVE FREEZE WAKE SCHEDULING

TECHNICAL FIELD

The present application relates to fuel-cell systems. The fuel-cell systems can be used, for example, in vehicles.

BACKGROUND

The use of fuel-cell systems is becoming more and more prevalent. For example, fuel-cell systems are one option for zero emission vehicles. The hardware in fuel-cell systems may be exposed to temperatures that reach the freezing point of water. Current solutions for protecting fuel-cell systems include the fuel-cell system periodically waking itself up and checking the ambient conditions, including the ambient temperature. Each time this waking occurs the fuel-cell will consume energy. If the fuel-cell system remains inactive for a long period of time, these waking events will add up to non-trivial energy amounts being expended.

SUMMARY

Fuel-cell systems and methods for shutting down and storing a fuel-cell system are disclosed. The fuel-cell systems may be shut down and stored in ambient conditions that include temperature below the freezing point of water.

One embodiment of disclosed methods comprises receiving a signal that the fuel-cell system is to be shut down, in response to receiving the signal, detecting whether an external communication connection is operational, in response to the external communication connection being operational, sending a request via the external communication connection to an external service for weather-related information, wherein the request includes location data related to the location of the fuel-cell system, in response to receiving from the external service, via the external communication connection, weather-related information related to the location of the fuel-cell system, analyzing whether the received weather-related information is of sufficient quality to generate a wake schedule for the fuel-cell system, in response to the received weather-related information being of sufficient quality to generate a wake schedule for the fuel-cell system, generating a wake schedule for the fuel-cell system, and performing a shutdown operation of the fuel-cell system.

One embodiment of a computer system for performing methods disclosed herein comprises one or more processors, and one or more non-transitory, computer-readable, storage media comprising computer-executable instructions that, when executed by the one or more processors, cause the computer system to perform the method.

In some embodiments, the fuel-cell system is on board a vehicle such as an electric vehicle powered by the fuel-cell system. In some embodiments, the fuel-cell system may power machinery other than a vehicle.

In some embodiments, computer systems for performing methods disclosed herein may be on board a vehicle such as a vehicle powered by the fuel-cell system. In some embodiments, the computer system may be considered part of machinery that is powered by the fuel-cell system. In some embodiments, portions of the computer systems may be external to the vehicle or machinery powered by the fuel-cell system.

DETAILED DESCRIPTION

Figure 1A:
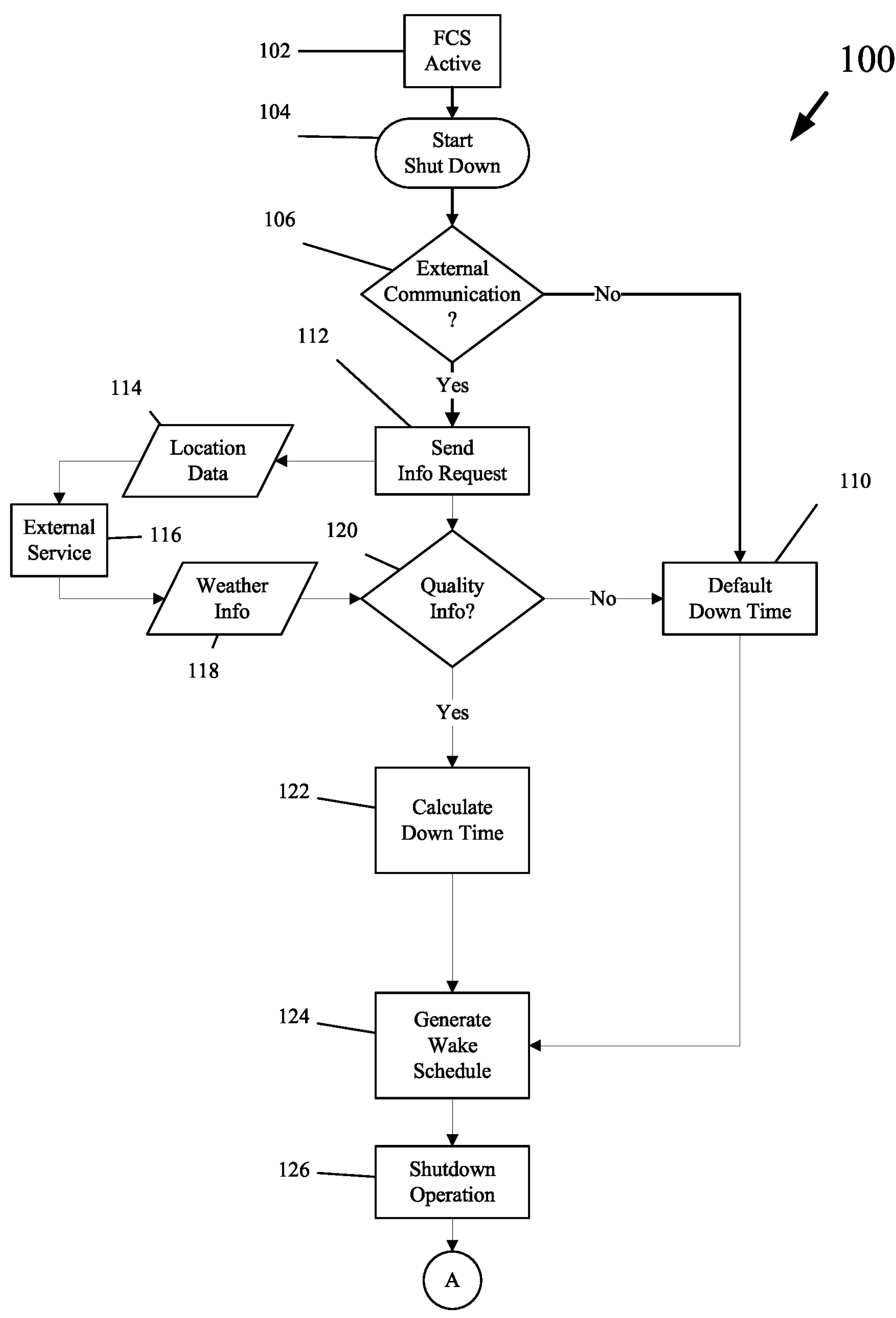
FIGS. 1A and 1B disclose an example embodiment of a method in accordance with the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figure, it is noted that a general-purpose processor may be temporarily enabled as a special purpose processor for the purpose of executing some or all of the exemplary methods shown by these figures or described herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Figure 1B:
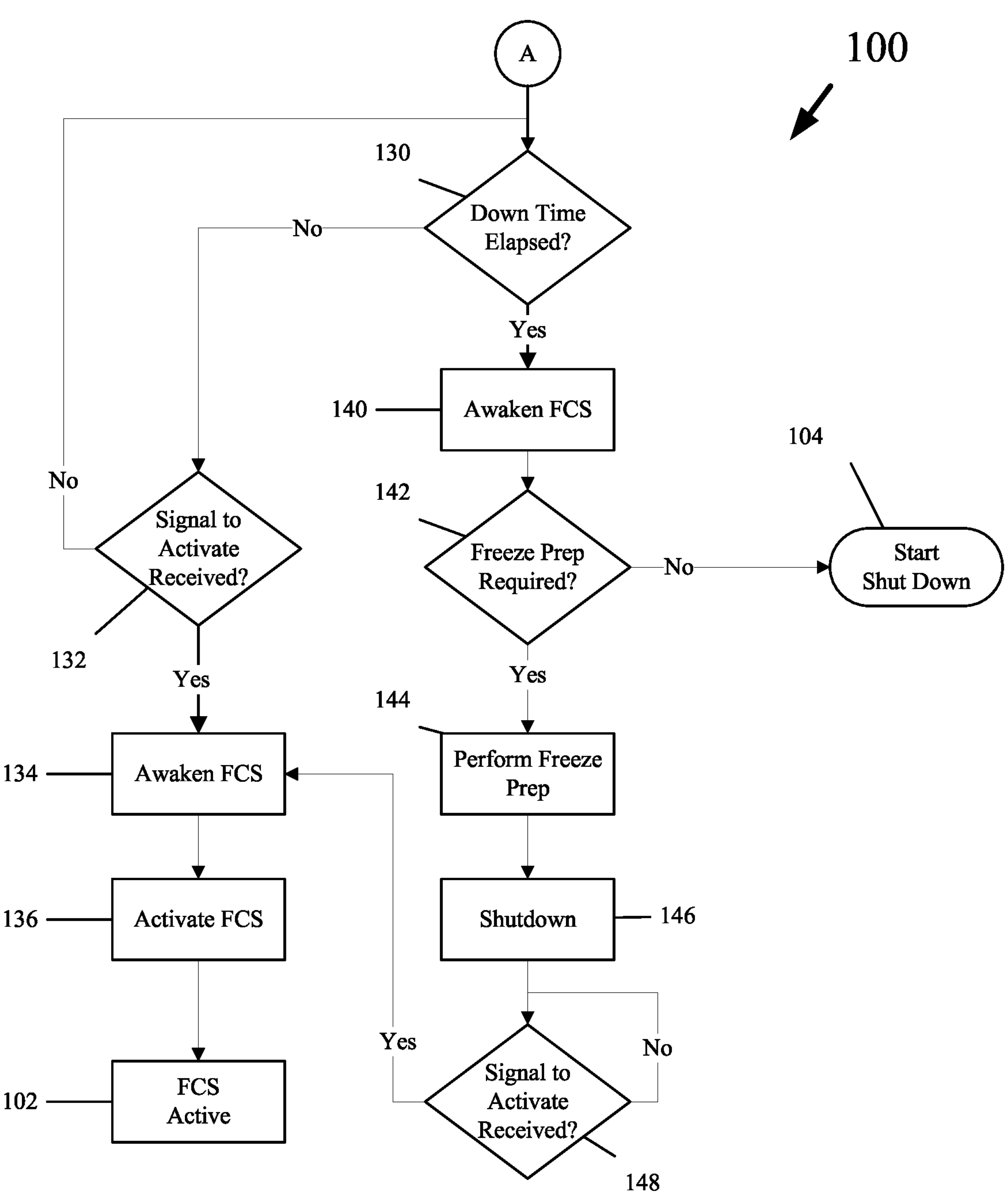

FIGS. 1A and 1B disclose an example embodiment of a method 100 in accordance with the present disclosure. At step 102, a fuel-cell system is in an active state. In some embodiments, the fuel-cell system will be powering a vehicle. In other embodiments, the fuel-cell system may be powering machinery other than a vehicle. In step 104, a process for shutting down the fuel-cell system is started at step 104. Step 104 may be initiated, for example, by receiving a signal from a vehicle or other machinery that the fuel-cell system is to be shut down. The signal may be received from a vehicle or other machinery powered by the fuel-cell system. For example, if an operator of a vehicle turns the vehicle off, the vehicle may send a signal to a controller, for example, to shut down the fuel-cell system powering the vehicle. As described below, step 104 may be initiated in response to determination at step 142 that no freeze preparation is required. Shutting down the fuel-cell system may include stopping power production from the fuel-cell system, determining how long the fuel-cell system should be shut down, monitoring the temperature of the fuel-cell system (e.g., monitoring the temperature of a fuel cell stack), and determining whether a freeze purge is necessary.

At step 106, the method 100 detects whether an external communication connection is operational. By external communication, it is meant herein that the communication connection is to a system external to the fuel-cell system. In some preferred embodiments, the communication connection will be to a system external to the vehicle or other machinery powered by the fuel cell. For example, the external communication may be made via the internet or the world wide web. The external service 116 may be a cloud service.

If at step 106 an external communication connection is not detected, then the method 100 proceeds to step 110. At step 110, the method 100 may provide a predetermined default time to be used as the down time in wake scheduling. The down time is an amount of time for which the fuel-cell system is to be shut down before being wakened. Upon completion of step 110, the method 100 proceeds to step 122 to generate a wake schedule using the default time as the down time.

If at step 106 an external communication connection is detected, then the method 100 sends 112 a request for weather-related information via the external communication connection to an external service 116. The request may include location data 114 related to the location of the fuel-cell system. For example, the location data 114 may include GPS coordinates of the fuel-cell system. The GPS coordinates may be provided by a vehicle or other machinery that is powered by the fuel-cell system. In other embodiments, the GPS coordinates may be provided by a GPS located in a storage facility housing the fuel-cell system.

In response to receiving weather-related information 118 from the external service 116 via the external communication connection, the method 100 analyzes 120 whether the received weather-related information 118 is of sufficient quality to calculate a down time for the fuel-cell system. The received weather-related information 118 may include, for example, a predicted freeze estimation. In some embodiments, the predicted freeze estimation includes an amount of time that is predicted to elapse before the temperature at the location of the fuel-cell system drops to a freezing point. In some embodiments, the freeze estimation includes a specific time (e.g., a date and time) at which a freeze is predicted to occur at the location of the fuel-cell system. In some embodiments, the weather-related formation 118 may include a confidence level in the accuracy of the weather-related information 118. In some embodiments, the weather-related information is of sufficient quality when the confidence level is above a predetermined threshold.

If at step 120 the quality of the weather-related information 118 is insufficient to calculate a down time, then the method 100 proceeds to step 110 where a default time is determined. The down time to be used for wake scheduling is set to the default time. Once a down time is determined at step 110, the method 100 proceeds to step 124 to generate a wake schedule for the fuel-cell system using the down time.

If at step 120 the quality of the weather-related information 118 is sufficient to calculate an amount of down time, the method 100 proceeds to step 122 to calculate the down time. The calculated down time may be an amount of time that the fuel-cell system can be shut down without creating a significant likelihood that a freezing point will be reached before the fuel-cell system is wakened. In some embodiments, the down time may be calculated using an amount of time received in a predicted freeze. For example, the amount of time received in a predicted freeze may be an upper bound on the down time. In some embodiments, the down time may be calculated using a specific time (e.g., a date and time) by calculating the down time as the difference between the specific time and the current time. In some embodiments, the method 100 may include a predetermined maximum down time. For example, if the predetermined maximum down time is less than the calculated down time, then the predetermined maximum down time may be used as the down time for wake scheduling instead of the calculated down time. Once the method 100 calculates a down time at step 122 the method 100 proceeds to step 124 to generate a wake schedule using the down time. At this point, the down time has been generated using the default time or calculated using the weather-related information 118.

At step 124, the method 100 generates a wake schedule. In some embodiments, the generated wake schedule includes an amount of time to elapse between a shutting down of the fuel cell system and a subsequent waking of the fuel-cell system to check whether a freeze preparation (e.g., a freeze purge) is necessary, referred to herein as the down time. In some embodiments, the down time will be long enough to reduce the number of times the fuel-cell system is awaken without having to perform a freeze preparation. An in some embodiments, the down time will be short enough to reduce or minimize the chance that a freeze occurs without a freeze preparation having been performed.

In some embodiments, the generated wake schedule includes a specific time (e.g., a date and time) at which the fuel-cell system can be subsequently awakened after it has been shut down. The method 100 may set a time on a clock to the down time and start the clock counting down to zero. In such embodiments, the clock may indicate at any given time how much time is left before the fuel-cell system should be awakened. When the clock reaches zero, no down time remains and the method 100 can awaken the fuel-cell system.

In some embodiments, the method 100 may add the down time to the current date and time to determine a date and time to awaken the fuel-cell system. When the method 100 determines that the current date and time has reached this determined date and time, the method 100 can awaken the fuel-cell system.

Once the method 100 has generated a wake schedule, the method proceeds to step 126 to continue shutting down the fuel-cell system. In step 126, the method 100 may stop power production from the fuel-cell system, for example.

As disclosed in FIG. 1B, once the method 100 has completed step 126, the method proceeds to step 130. In step 130, the method 100 determines if the down time has elapsed. In some embodiments, the method 100 will determine that the fuel-cell system should be awakened when a clock has reached zero, indicating there is no down time remaining. In some embodiments, the method will awaken the fuel-cell system when the current date and time has reached or exceeded the determined date and time indicating there is no down time remaining. If there is down time remaining, the method 100 may determine 132 whether a signal to activate the fuel-cell system has been received. If a signal to activate the fuel-cell system has not been received, the method 100 may return to step 130. If a signal to activate the fuel-cell system has been received, the method 100 may, in response to receiving the signal, proceed to step 134 to awaken the fuel-cell system.

In step 134, the method 100 awakens the fuel-cell system and then proceeds to step 136 to activate the fuel-cell system. Once the fuel-cell system is activated, the method 100 may return to step 102 in which the fuel-cell system is active.

If the method 100 determines at step 130 that no down time remains (i.e., the down time has elapsed), then the method 100 proceeds to step 140 to awaken the fuel-cell system. At step 140, the method 100 awakens the fuel-cell system and then proceeds to step 142. Awakening the fuel-cell system may include any steps necessary to enable the method to determine whether a freeze preparation is necessary. For example, the fuel-cell system may be awakened to measure the current temperature of a fuel cell stack. At step 142, the method 100 determines whether the fuel-cell system should be prepared for a freeze. If no freeze preparation is necessary, then the method 100 may initiate another shutdown period. In some embodiments, the method 100 may initiate another shutdown period by returning to step 106.

If the method 100 determines at step 142 that the fuel-cell system should be prepared for a freeze, then the method 100 proceeds to step 144 to perform any necessary operations to prepare the fuel-cell system for a freeze. Operations in step 144 may include purging water out of reactant gas flow channels in the fuel-cell system. For example, purge processing may supply a purge gas to a fuel cell to reduce an amount of water in the fuel cell. Upon completion of step 144, the method 100 proceeds to step 146 to shut down the fuel-cell system. Upon completion of step 146, the method 100 proceeds to step 148.

At step 148, the method 100 determines whether a signal to activate the fuel-cell system has been received. If a signal to activate the fuel-cell system has not been received the method 100 may stay at step 148. If a signal to activate the fuel-cell system has been received, the method 100 may, in response to receiving the signal, proceed to step 134 to awaken the fuel-cell system. Awakening the fuel-cell system may include any operations necessary for activating the fuel-cell system. For example, awakening the fuel-cell system may include measuring the temperature of a fuel cell stack in the fuel-cell system. If needed, the fuel cell stack may be warmed to a predetermined temperature necessary for activating the fuel-cell system. When step 136 is completed method 100 proceeds to step 136 to activate the fuel-cell system. Activating the fuel-cell system may include any steps necessary for the fuel cell system to produce power.

Figure 2:
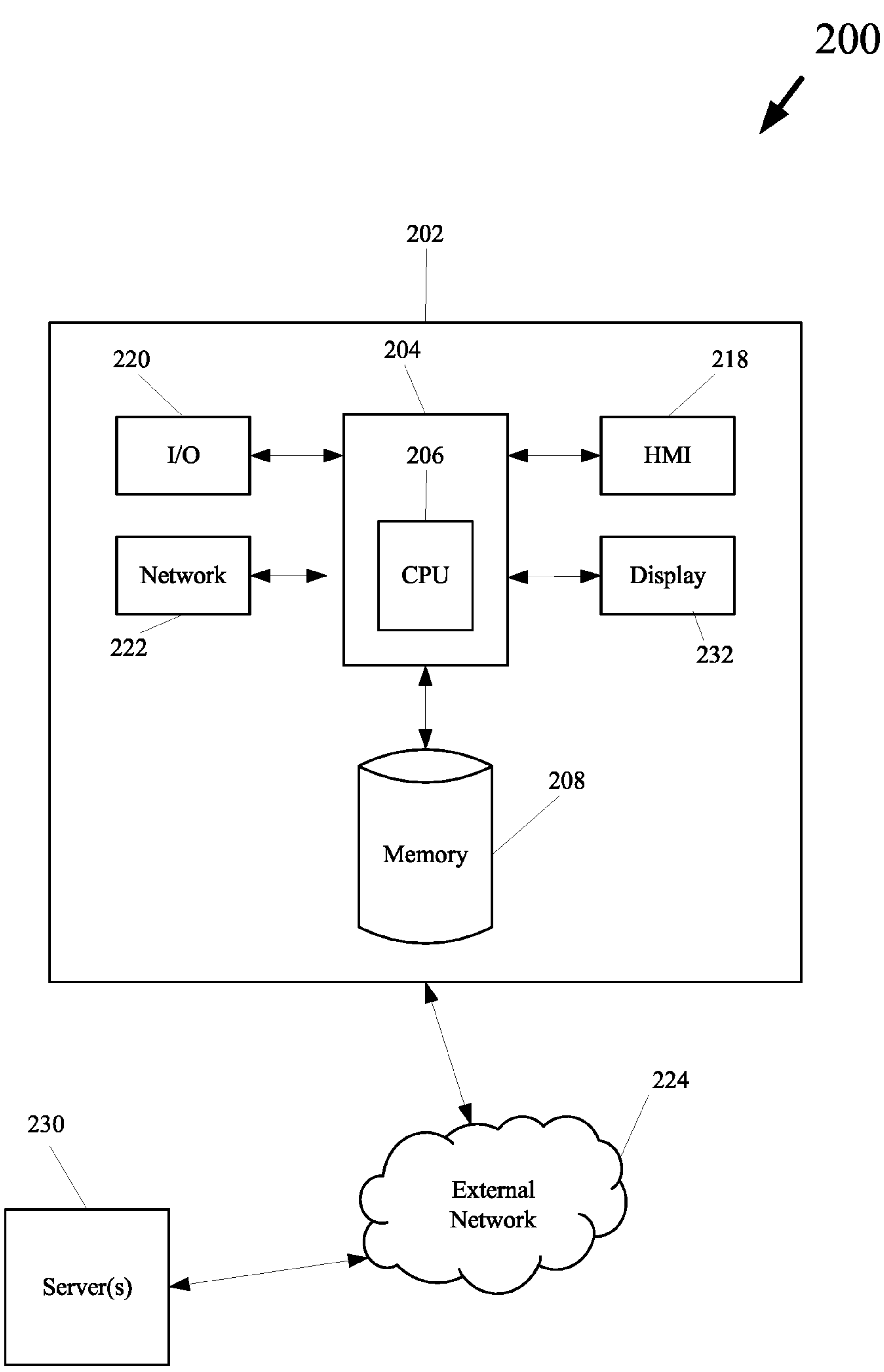
FIG. 2 discloses an example embodiment of a computer system in accordance with the present disclosure.

FIG. 2 discloses an example embodiment 200 of a computer system 202 in accordance with the present disclosure. The computing system 202 may include at least one processor 204 that is operatively connected to a memory unit 208. The processor 204 may be one or more integrated circuits that implement the functionality of a central processing unit (CPU) 206. It is contemplated that CPU 206 may also be one or more integrated circuits that implement the functionality of a general processing unit or a specialized processing unit (e.g., graphical processing unit, ASIC, FPGA).

The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operations described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data.

The computing system 202 may include a network interface device 222 that is configured to provide communication with external systems and devices. For example, the network interface device 222 may include a wired and/or wireless Ethernet interface as defined by the Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 202 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

Other embodiments may be implemented using one or multiple computing systems. While the example embodiment 200 depicts a single computing system 202 that implements all the described features, it is intended that various features and functions may be separated and implemented by multiple computing units in communication with one another. The particular system architecture selected may depend on a variety of factors.

Figure 3:
FIG. 3 discloses an example embodiment of a vehicle in accordance with the present disclosure.
Figure 3:
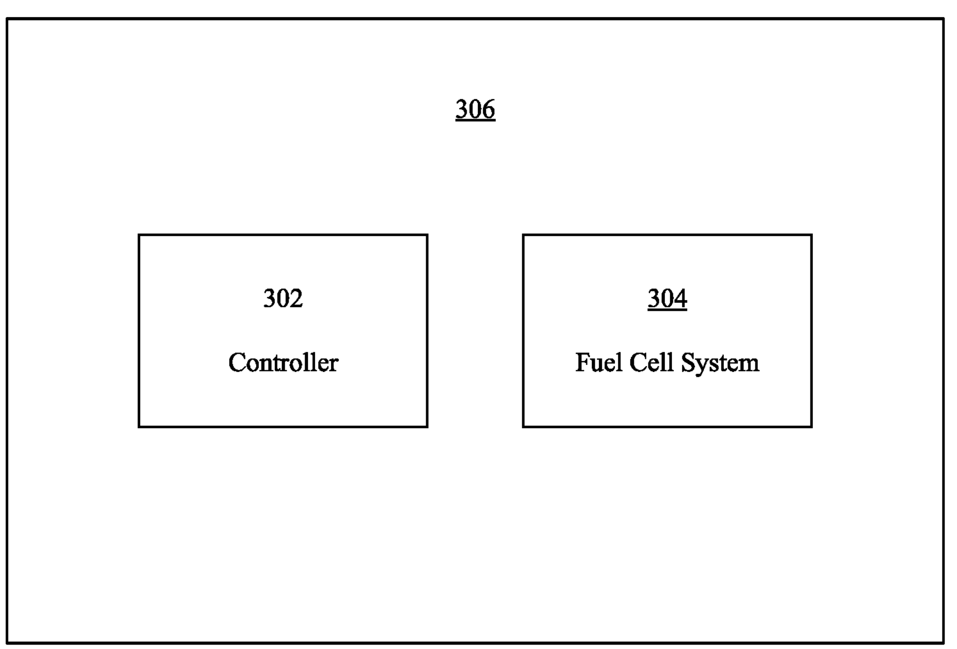

FIG. 3 discloses an example embodiment 300 of a vehicle 306 in accordance with the present disclosure. The vehicle 306 includes a fuel-cell system 304 and a controller 302. The controller 302 may perform operations disclosed herein for controlling the fuel-cell system 304. The controller 302 may include the computing system 202 shown in FIG. 2, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. The word controller and controllers, for example, may be used interchangeably herein.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:

a fuel cell system; and one or more processors programmed to, while the vehicle is parked, perform a wake operation for the fuel cell system at a time defined by a schedule such that the time is based on obtained weather forecast data for a location of the vehicle responsive to a confidence associated with the weather forecast data exceeding a threshold and is based on a default setting responsive to the confidence not exceeding the threshold.

2. The vehicle of claim 1, wherein the one or more processors are further programmed to, after receiving a signal to shut down the fuel cell system, generate the schedule.

3. The vehicle of claim 1, wherein the one or more processors are further programmed to, after performing the wake operation, update the schedule.

4. The vehicle of claim 3, wherein the one or more processors are further programmed to obtain additional weather forecast data after performing the wake operation.

5. The vehicle of claim 1, wherein the one or more processors are further programmed to inhibit performing the wake operation responsive to presence of a predefined condition.

6. The vehicle of claim 5, wherein the predefined condition is ambient temperature exceeding a predefined value.

7. The vehicle of claim 1, wherein the one or more processors are further programmed to receive off-board commands to perform the wake operation.

8. A fuel cell system for a vehicle comprising:

a fuel cell stack; and one or more processors programmed to, while the vehicle is parked, perform a wake operation for the fuel cell stack responsive to receiving an off-board command to perform the wake operation, and perform the wake operation at a time defined by a schedule such that the time is based on a default setting responsive to off-board communication being unavailable.

9. The fuel cell system of claim 8, wherein the one or more processors are further programmed to, after receiving a signal to shut down the fuel cell system, generate the schedule.

10. The fuel cell system of claim 8, wherein the one or more processors are further programmed to, after performing the wake operation, update the schedule.

11. The fuel cell system of claim 8, wherein the one or more processors are further programmed to inhibit performing the wake operation responsive to presence of a predefined condition.

12. The fuel cell system of claim 11, wherein the predefined condition is ambient temperature exceeding a predefined value.

* * * * *